US009152716B1

(12) United States Patent
Triandopoulos et al.

(10) Patent No.: US 9,152,716 B1
(45) Date of Patent: Oct. 6, 2015

(54) TECHNIQUES FOR VERIFYING SEARCH RESULTS OVER A DISTRIBUTED COLLECTION

(71) Applicant: EMC Corporation, Hopkinton, MA (US)

(72) Inventors: Nikolaos Triandopoulos, Arlington, MA (US); Michael T. Goodrich, Irvine, CA (US); Duy Nguyen, Redwood City, CA (US); Olga Ohrimenko, Providence, RI (US); Charalampos Papamanthou, Berkeley, CA (US); Roberto Tamassia, Providence, RI (US); Cristina Videira Lopes, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 185 days.

(21) Appl. No.: 13/731,885

(22) Filed: Dec. 31, 2012

(51) Int. Cl.
*G06F 17/30* (2006.01)

(52) U.S. Cl.
CPC ................ *G06F 17/30864* (2013.01)

(58) Field of Classification Search
CPC .................................. G06F 17/30876
See application file for complete search history.

(56) References Cited

U.S. PATENT DOCUMENTS

| 2008/0005086 | A1* | 1/2008 | Moore | 707/3 |
| 2009/0070290 | A1* | 3/2009 | Nye | 707/2 |
| 2010/0250497 | A1* | 9/2010 | Redlich et al. | 707/661 |
| 2011/0225429 | A1* | 9/2011 | Papamanthou et al. | 713/189 |
| 2012/0030468 | A1* | 2/2012 | Papamanthou et al. | 713/171 |

OTHER PUBLICATIONS

Mikhail J. Atallah, et al., "Efficient Data Authentication in an Environment of Untrusted Third-Party Distributors," Proceedings of the 2008 IEEE 24th International Conference on Data Engineering, Apr. 2008, pp. 696-704, IEEE, Cancun, Mexico.

E. Bertino, et al., "Selective and Authentic Third-Party Distribution of XML Documents," Paper 187, 32 pages, Feb. 2002; IEEE Transactions on Knowledge and Data Engineering, 2004, pp. 1263-1278, vol. 16, Issue 10, IEEE.

Ahto Buldas, et al., "Accountable Certificate Management using Undeniable Attestations," CCS '00 Proceedings of the 7th ACM Conference on Computer and Communication Security, Nov. 2000, pp. 9-17, ACM, New York, NY.

Jan Camenisch, et al., "Dynamic Accumulators and Application to Efficient Revocation of Anonymous Credentials," Advances in Cryptology—CRYPTO 2002: 22nd Annual International Cryptology Conference, Proceedings, 2002, pp. 61-76, Lecture Notes in Computer Science, vol. 2442, Springer.

Premkumar Devanbu, et al., "Flexible Authentication of XML Documents," CCS '01 Proceedings of the 8th ACM Conference on Computer and Communications Security, Nov. 2001, pp. 136-145, ACM, New York, NY.

Premkumar Devanbu, et al., "Authentic Data Publication over the Internet," Journal of Computer Security, vol. 11, Issue 3, Mar. 2002, pp. 291-314, IOS Press Amsterdam.

(Continued)

*Primary Examiner* — Mohammad S Rostami
(74) *Attorney, Agent, or Firm* — BainwoodHuang

(57) ABSTRACT

An improved search engine technique allows a user to ensure that an untrusted search engine provides complete and correct search results without requiring large proofs for large data collections. Thus techniques are presented for a trusted crawler to index a distributed collection of documents and create an authenticated search structure that allows an untrusted search server to return reliably complete and correct search results.

12 Claims, 5 Drawing Sheets

(56) References Cited

OTHER PUBLICATIONS

Michael T. Goodrich, et al., "An Efficient Dynamic and Distributed Cryptographic Accumulator," Information Security Lecture Notes in Computer Science, 2002, vol. 2433, pp. 372-388, Springer.

Michael T. Goodrich, et al., "Implementation of an Authenticated Dictionary with Skip Lists and Commutative Hashing," Proceedings DARPA Information Survivability Conference and Exposition II, Jun. 2001, pp. 68-82, vol. II, IEEE, Los Alamitos, California.

Michael T. Goodrich, et al., "Efficient Authenticated Data Structures for Graph Connectivity and Geometric Search Problems," Algorithmica, vol. 60, Issue 3, Jul. 2011, pp. 505-552, Springer.

Michael T. Goodrich, et al., "Super-Efficient Verification of Dynamic Outsourced Databases," Topics in Cryptology—CT-RSA 2008: The Cryptographers' Track at the RSA Conference 2008, pp. 407-424, Lecture Notes in Computer Science, vol. 4964, Springer.

F. Li, et al., "Dynamic Authenticated Index Structures for Outsourced Databases," Proceedings of the ACM SIGMOD International Conference on Management of Data, Jun. 2006, pp. 121-132, ACM, New York, NY.

Charles Martel, et al., "A General Model for Authenticated Data Structures," Algorithmica, vol. 39, Issue 1, pp. 21-41, Jan. 2004, Springer.

Ralph C. Merkle, "A Certified Digital Signature," Advances in Cryptology—CRYPTO'89, Proceedings, 1989, pp. 218-238, Lecture Notes in Computer Science, vol. 435, Springer.

Michael Naehrig, et al., "New Software Speed Records for Cryptographic Pairings," Progress in Cryptology—Latincrypt 2010: Progress in Cryptology—Latincrypt 2010 First International Conference on Cryptology and Information Security in Latin America, Proceedings, Aug. 2010, pp. 109-123, Lecture Notes in Computer Science, vol. 6212, Springer.

Moni Naor, et al., "Certificate Revocation and Certificate Update," SSYM '98 Proceedings of the 7th conference on USENIX Security Symposium, pp. 217-228, vol. 7, Jan. 1998, USENIX Association, Berkeley, CA.

Maithili Narasimha, at al., "Authentication of Outsourced Databases using Signature Aggregation and Chaining," Database Systems for Advanced Applications: 11th International Conference, DASFAA 2006, Proceedings, Apr. 2006, pp. 420-436, Lecture Notes in Computer Science, vol. 3882, Springer.

Lan Nguyen, "Accumulators from Bilinear Pairings and Applications to ID-based Ring Signatures and Group Membership Revocation," Topics in Cryptology—CT-RSA 2005: The Cryptographers' Track at the RSA Conference 2005, Lecture Notes in Computer Science, vol. 3376, 2005, Springer.

Glen Nuckolls, "Verified Query Results from Hybrid Authentication Trees," Data and Applications Security XIX, 19th Annual IFIP WG 11.3 Working Conference on Data and Applications Security, Proceedings, Aug. 2005, pp. 84-98, Lecture Notes in Computer Science, vol. 3654, Springer.

Hweehwa Pang, et al., "Verifying Completeness of Relational Query Results in Data Publishing," Proceedings of the ACM SIGMOD International Conference on Management of Data, Jun. 2005, pp. 407-418, ACM, New York, NY.

Hweehwa Pang, et al., "Authenticating the Query Results of Text Search Engines," Proceedings of the VLDB Endowment, Aug. 2008, pp. 126-137, vol. 1, Issue 1, ACM, New York, NY.

Charalampos Papamanthou, et al., "Authenticated Hash Tables," CCS '08 Proceedings of the 15th ACM Conference on Computer and Communications Security, Oct. 2008, pp. 437-448, ACM, New York, NY.

Charalampos Papamanthou, et al., "Optimal Verification of Operations on Dynamic Sets," Advances in Cryptology—CRYPTO 2011: 31st Annual International Cryptology Conference, Proceedings, 2011, pp. 91-110, Lecture Notes in Computer Science, vol. 6841, Springer.

Roberto Tamassia, et al., "Certification and Authentication of Data Structures," Proceedings of the 4th Alberto Mendelzon International Workshop on Foundations of Data Management, May 2010, CEUR Workshop Proceedings, vol. 619.

Roberto Tamassia, et al., "Computational Bounds on Hierarchical Data Processing with Applications to Information Security," Automata, Languages and Programming: 32nd International Colloquium, ICALP 2005, Proceedings, Jul. 2005, Lecture Notes in Computer Science, vol. 3580, Springer.

Yin Yang, et al., "Authenticated Join Processing in Outsourced Databases," Proceedings of the ACM SIGMOD International Conference on Management of Data, 2009, pp. 5-18, ACM, New York, NY.

Man Lung Yiu, et al., "Efficient Verification of Shortest Path Search via Authenticated Hints," 2010 IEEE 26th International Conference on Data Engineering, 2010, pp. 237-248, vol. 1, IEEE.

Justin Zobel, et al., "Inverted Files for Text Search Engines," ACM Computing Surveys, Jul. 2006, vol. 38, No. 2, Article 6, 56 pages, ACM, New York, NY.

Roberto Tamassia, "Authenticated Data Structures," Proceedings of the 11th Annual European Symposium on Algorithms, 2003, pp. 2-5, Lecture Notes in Computer Science, vol. 2832, Springer.

* cited by examiner

TECHNIQUES FOR VERIFYING SEARCH RESULTS OVER A DISTRIBUTED COLLECTION

STATEMENT OF GOVERNMENT RIGHTS

This invention was made with government support under grants CNS-1012060, CNS-1012798, CNS-1012910, OCI-0724806, and CNS-0808617 awarded by the U.S. National Science Foundation. The government has certain rights in the invention. Applicants make no admission about what the extent of those rights is.

BACKGROUND

Web searches are an important feature of modern life in the Internet age. In a conventional system, a user sends a web query to a search engine, which performs a search using data structures resulting from web crawling. The search returns a set or a subset of all web pages that match the query terms.

In some conventional systems, the results are ranked based on a relevancy score. In some improved conventional systems, a user is able to verify that the relevancy ranking was performed correctly.

SUMMARY

Unfortunately, the above-described systems do not allow a user to ensure that an untrusted search engine provides complete and correct search results. For example, although the search engine may return the entire set of all web pages that match the query terms, the user is unable to verify that the search engine has returned all of the web pages that match the query terms, since omissions are not easily detectible. Even the improved conventional system is only able to verify a relative ranking order, but not the completeness of the results. Furthermore, the improved conventional system does not scale well to the World Wide Web because as the size of the set of searched documents grows, the size of ranking proof offered to the user also grows.

It would be desirable to provide a search engine technique that allows a user to ensure that an untrusted search engine provides complete and correct search results without requiring large proofs for large data collections. Thus techniques are presented for a trusted crawler to index a distributed collection of documents and create an authenticated search structure that allows an untrusted search server to return reliably complete and correct search results.

In one embodiment a method performed by a crawler application running on a computing device connected to a network is disclosed. The method includes (1) crawling through a distributed collection of data sets available on the network, at least one data set of the distributed collection being published by an entity distinct and under separate control from the crawler, to generate a search structure indexing a plurality of searchable data items found within the distributed collection of data sets, the search structure establishing a correspondence between each searchable data item and particular data sets that contain that searchable data item, (2) generating an authenticated search structure, the authenticated search structure including the search structure and a set of item witnesses using an authentication primitive associated with a set of security parameters, each item witness associated with a particular searchable data item and serving to cryptographically verify which data sets of the distributed collection of data sets correspond to that searchable data item as indicated by the search structure, (3) building a digest of the distributed collection of data sets using the authenticated search structure, (4) signing the digest to produce a digest signature, (5) sending the authenticated search structure and the digest to a search server, and (6) publishing the digest signature and the set of security parameters for access by client devices to allow client devices to authenticate results of searches for particular searchable data items performed by the search server over the distributed collection of data sets. Other embodiments are directed to a computerized apparatus and computer program product.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views.

DETAILED DESCRIPTION

Techniques are presented for a trusted crawler to index a distributed collection of documents and create an authenticated search structure that allows an untrusted search server to return reliably complete and correct search results.

Figure 1:
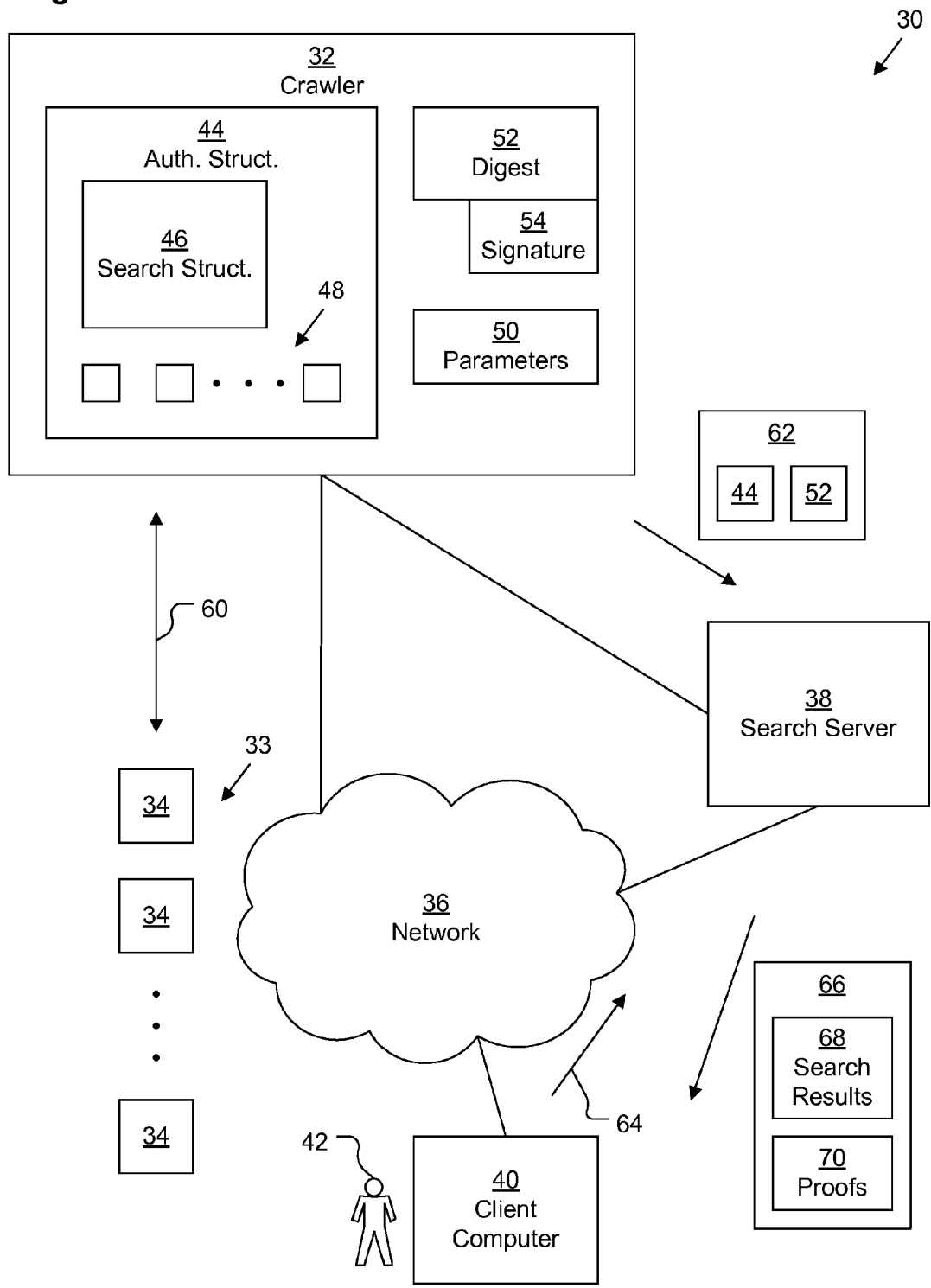
FIG. 1 is a block diagram depicting an example environment in which various embodiments may be practiced.

FIG. 1 depicts an example authenticated search system 30 for use in performing various embodiments. System 30 includes a crawler device 32 connected to a network 36, which also connects to one or more clients 40 and one or more search servers 38. A user 42 operates a client 40.

Network 36 may be any kind of network, such as, for example, a local area network, a wide area network, a storage area network, the Internet, a fabric of interconnected hubs and switches, etc. In some embodiments, in lieu of a network, direct point-to-point connections may be used.

Crawler device, search server 38 and client computer 40 may be any kinds of computing devices, such as, for example, personal computers, workstations, servers, enterprise servers, laptop computers, mobile computers, smart phones, tablet computers, etc. Crawler device 32 and search server 38 will typically be a server or enterprise server. Client 40 will typically be a personal computer, workstation, laptop computer, mobile computer, smart phone, or tablet computer.

Crawler device 32 stores an authenticated search structure 44, made up of a search structure 46 and a set of data item witnesses 48. Search structure 46 is generated upon crawler device 32 performing a crawling operation 60 over a distributed collection 33 of data sets 34 available via the network 36. The distributed collection 33 of data sets 34 is typically under the control of multiple entities which are under separate control. For example, the distributed collection 33 of data sets 34 may be a collection of hyperlinked web pages available over the World Wide Web. In some embodiments, all data sets 34 of the distributed collection 33 of data sets 34 may be under the control of a single entity, but, in such embodiments, the single entity that controls the distributed collection 33 of data sets 34 is distinct and separate from the entity that controls the crawler device 32.

Search structure 46 allows for simplified searches for data items (e.g., searchable terms) within the distributed collection 33 of data sets 34 (e.g., using an indexed structure) that do not require direct reference to the distributed collection 33 of data sets 34. Item witnesses 48 are generated using an authentication primitive associated with a set of security parameters 50. Each item witness 48 is associated with a particular searchable data item and serves to cryptographically verify which data sets 34 of the distributed collection 33 of data sets 34 correspond to a searchable data item as indicated by the search structure 46. It should be understood that the searchable data items may have various overlapping levels of granularity. Thus, for example, it is possible that the term "hot" might be one searchable data item, the word "hot-dog" a second narrower data item, and the phrase "hot-dog bun" a third even narrower data item.

Crawler device 32 also stores a digest 52 of the distributed collection 33 of data sets 34 created using the authenticated search structure 44. Crawler device 32 also stores a cryptographic signature 54 of the digest 52.

Periodically, upon crawling the distributed collection 33 of data sets 34, the crawler device sends a crawling result 62 to the search server 38. The crawling result 62 includes the authenticated search structure 44 and the digest signature 54. The crawler device 62 also publishes (not depicted) certain pieces of data, including some of the parameters 50 to the network 36 for access by clients 40.

User 42 of client 40 is then able to send a search request 64 to the search server 38 and receive in return a query response 66. The query response 66 includes search results 68 and a set of proofs 70 which allow the client 40 to prove (by combining proofs 70, search results 68, and the published data) that the search results 68 are correct and complete. Thus, user 42 can be sure that the search server is not omitting or adding any results and that no Man in the Middle has interfered with the search results 68.

Figure 2:
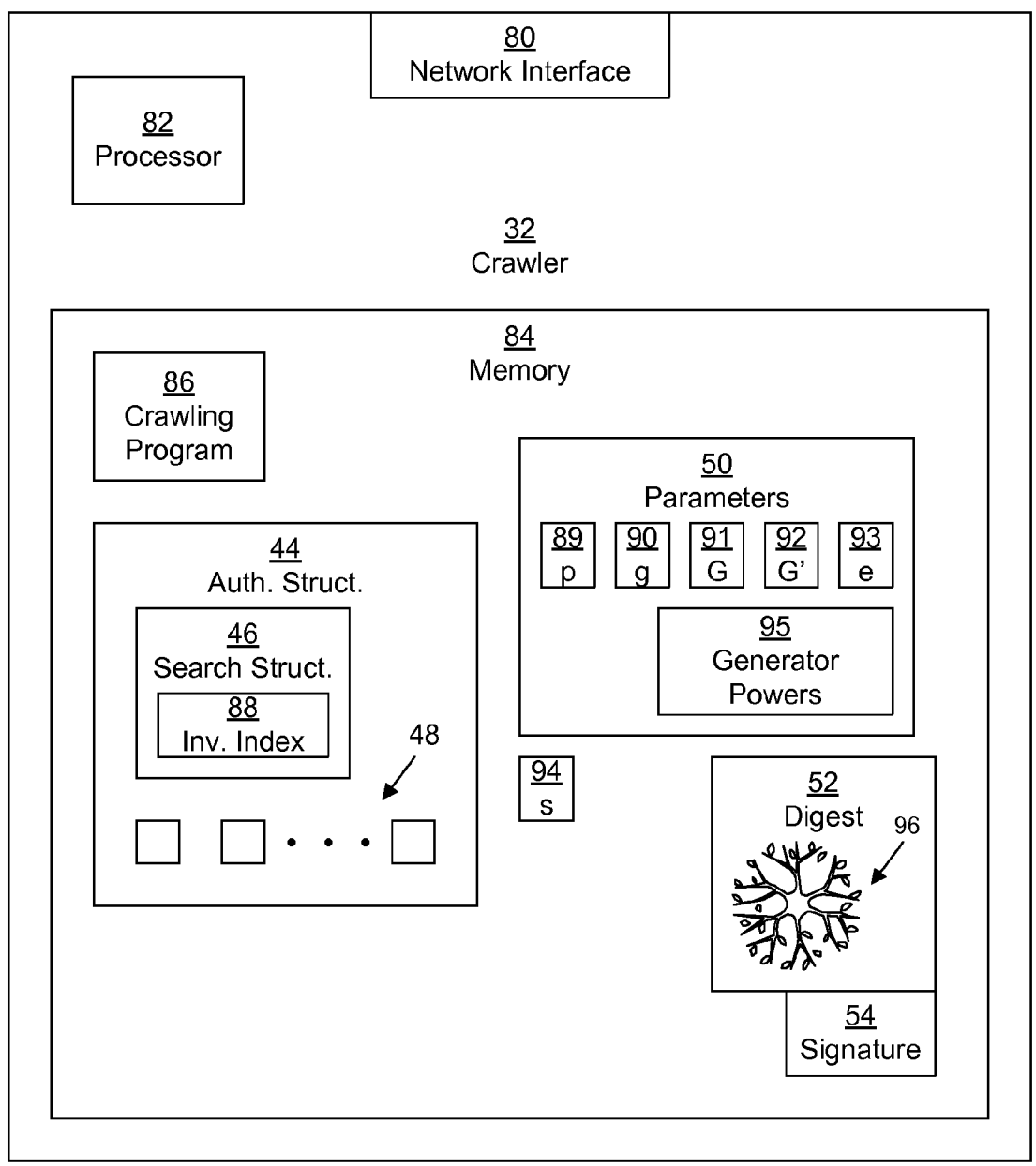
FIG. 2 is a block diagram depicting an example apparatus of various embodiments.

FIG. 2 depicts an example crawler device 32 in further detail. Crawler device 32 includes a network interface 80, a processor 82, and memory 84.

Network interface 80 connects crawler device 32 to network 36. Processor 82 may be any kind of processor or set of processors configured to perform operations, such as, for example, a microprocessor, a multi-core microprocessor, a digital signal processor, a collection of electronic circuits, or any combination of the above.

Memory 84 may be any kind of digital memory, such as, for example, random access memory, read-only memory, static memory, volatile memory, non-volatile memory, system memory, solid-state storage, disk-based storage, or some combination of the above. Memory 84 stores programs executing on processor 82 as well as data used by those programs. Memory 84 may store an operating system (not depicted) and a crawling program 86, both of which run on processor 82. Memory 84 may include both a system memory portion for storing programs and data in active use by the processor 82 as well as a persistent storage portion (e.g., solid-state storage and/or disk-based storage) for storing programs and data even while the crawler device 32 is powered off. Crawling program 86 is typically stored both in system memory and in persistent storage so that it may be loaded into system memory from persistent storage upon a system restart. Crawling program 86, when stored in non-transient form either in system memory or in persistent storage, forms a computer program product. The processor 82 running the crawling program 86 thus forms a specialized circuit constructed and arranged to carry out various processes described herein.

Memory 84 may also store various data, including authenticated search structure 44, security parameters 50, digest 52, and cryptographic signature 54.

In some embodiments, the distributed collection 33 of data sets 34 is a collection of hyperlinked web pages of the World Wide Web or some other distributed web collection. In some of these embodiments, search structure 46 may be formed as an inverted index 88 which maps searchable query terms (e.g., most words and proper names, excluding certain extremely common words, such as prepositions and articles) to all data sets 34 (e.g., web pages) that contain those searchable terms. In these embodiments, the item witnesses 48 are term witnesses, each one being uniquely associated with a searchable query term).

In some embodiments, security parameters 50 include a set of accumulator parameters, such as a prime integer order, p, 89; a generator element, g, 90; a first cyclic multiplicative group, G, 91 of order p 89, G 91 being generated by g 90; a second cyclic multiplicative group, G', 92 of order p 89; and a non-degenerate bilinear pairing, e, 93, e 93 mapping G×G→G'. Prime integer order p 89 is typically very large prime number, for example a prime number larger than $2^{128}$. Memory 84 also stores a secret key, s, 94 drawn from $Z_p^*$ in connection with the security parameters 50, however secret key s 94 is not part of parameters 50 that are published. Secret key s 94 is typically less than prime integer order p 89.

In some embodiments, the security parameters also include a set of generator powers 95. The set of generator powers 95 includes pre-calculated powers of g raised to s 94 raised to various consecutive integer powers (e.g., $g^{\wedge}(s^1), g^{\wedge}(s^2), g^{\wedge}(s^3)$, etc.) up to a maximum number of web pages associated with any query term from inverted index 88. Thus, if the most common searchable term in the distributed collection 33 of data sets 34 is the word "eat," and the word "eat" appears in 1.3 million documents, then 1.3 million generator powers 95 (ranging from $g^{\wedge}(s^1)$ to $g^{\wedge}(s^{1.3\ million})$) are stored.

In some embodiments, the digest is a Merkle hash tree 96, the leaves of the Merkle hash tree being based on the item witnesses 48 (e.g., term witnesses). In these embodiments, the digest signature 54 may be formed by applying a cryptographic hash function to sign the root node of the Merkle hash tree 96.

Figure 3:
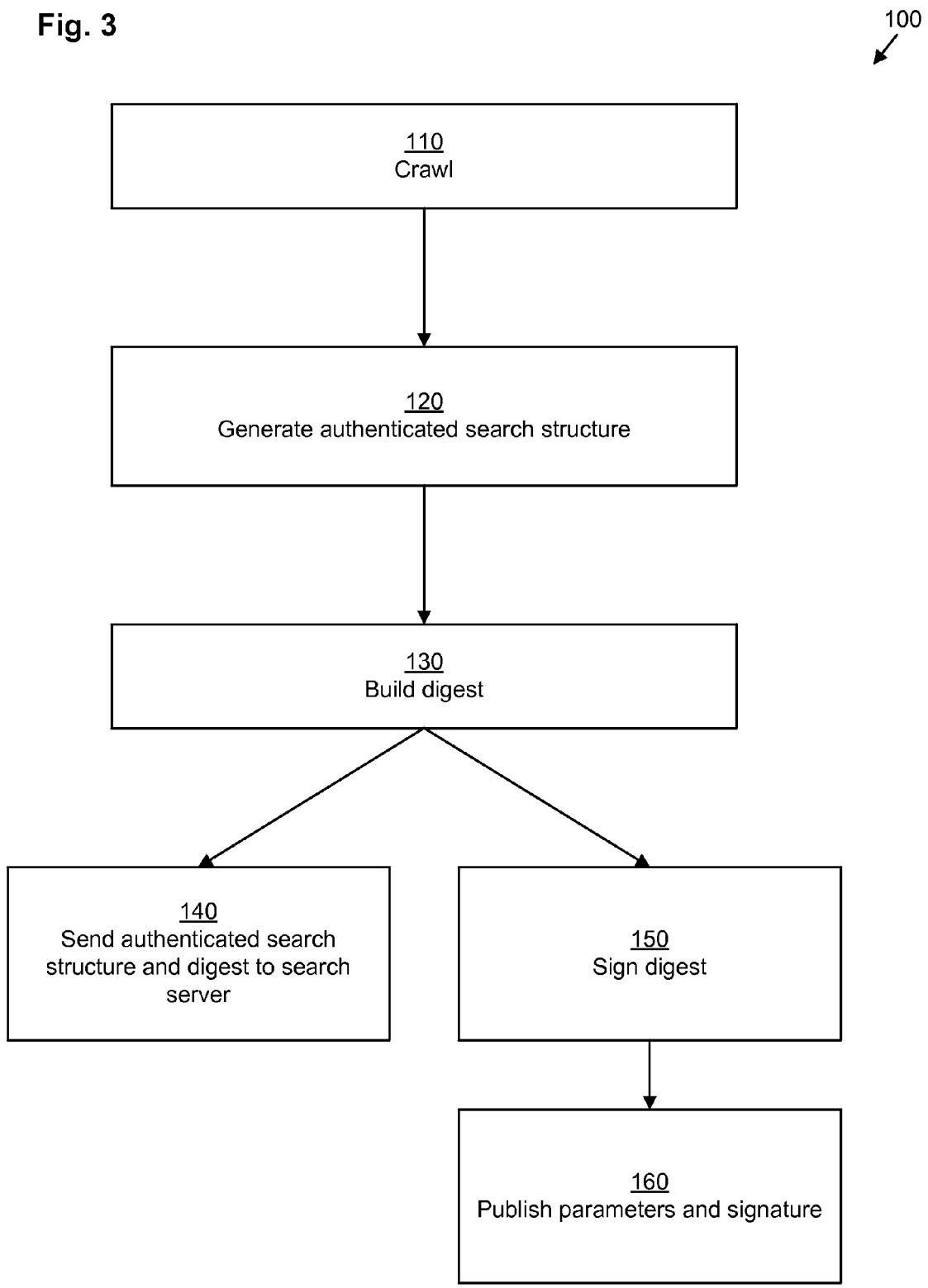
FIGS. 3, 4, and 5 are flowchart diagrams depicting example methods of various embodiments.

FIG. 3 depicts an example method 100 for configuring an authenticated search system 30. FIG. 3 is performed by crawling program 86.

It should be understood that any time a piece of software, such as, for example, crawling program 86 is described as performing a method, process, step, or function, in actuality what is meant is that the computing device on which that piece of software is running (e.g., crawler device 32) performs the method, process, step, or function when executing that piece of software on processor (e.g., processor 82).

In step 110, crawling program 86 crawls through distributed collection 33 (e.g., the World Wide Web) of data sets 34 (e.g., hyperlinked web pages) to create search structure (e.g., inverted index 88). This may be done according to well-established techniques.

In step 120, which may be performed in parallel with step 110 in some embodiments, crawling program 86 generates authenticated search structure 44 by creating item witnesses 48 (e.g., term witnesses) associated with the data items (e.g., searchable query terms) indexed by search structure 46, and combining the item witnesses 48 with the search structure 46.

In some embodiments, each data set 34 (e.g., web page) has a unique index $t_i$. This index $t_i$ may be formed in various ways, for example, by applying a cryptographic hash function modulo a large prime number (e.g., greater than $2^{128}$ or $2^{256}$) to the contents of each data set 34. Thus, any two non-identical data sets are extremely unlikely to yield the same index $t_i$. In embodiments in which the data sets 34 are web pages, certain data from the web pages (e.g., rotating advertisements) may be excluded from the application of the cryptographic hash function.

In some embodiments, crawling program 86 creates item witnesses 48 (e.g., term witnesses) by using a bilinear map accumulator. For example, for a first data item (e.g., searchable query term, such as "cat"), which, according to inverted index 88 is found in a a plurality of data set 34 making up a term set, TS=$\{t_i$ for all $t_i$ in which the first data item is found$\}$, item witness 48 is equal to $$g^{\prod_{t_i} s+t_i}.$$

Later, if crawling is performed again and a data item is found to have been added to term set TS, it is easy to update the in order to update the item witnesses 48 by raising the old item witnesses 48 to the power of $(s+t_i)$. If a data item is found to have been removed from term set TS, the old item witnesses 48 may be raised to the power of $(s+t_i)^{-1}$.

In step 130, crawling program 86 builds digest 52. In some embodiments, this is done by creating Merkle hash tree 96. Every data item (e.g., searchable query term) is assigned an item index, allowing the item witness 48 for each data item to be represented as T[j] for item index j. Each leaf of the Merkle hash tree 96 may be assigned to a value of hash (j∥T[j]). Crawling program 86 can then easily calculate the nodes of Merkle hash tree 96 using well-known procedures. Later, if crawling is performed again, and an item witness 48 has changed, the respective leaf of the Merkle hash tree 96 can be modified, and only nodes along a direct path from the changed leaf to the root node need be recalculated.

In step 140, crawling program 86 sends the authenticated search structure 44 and the digest 52 (e.g., Merkle hash tree 96) to the search server 38. This provides search server 38 with enough information to properly respond to queries 64 from clients 40, as described below in further detail in connection with FIG. 4.

In step 150, which may be performed in parallel with step 140, crawling program 86 signs the digest 52. If digest 52 is a Merkle hash tree 96, this may be accomplished by applying a cryptographic signature function to the root of the Merkle hash tree 96. Then, in step 160, crawling program causes certain security parameters 50 and signature 54 to be published on the network 36 (however, secret key s 94 is not published), so that any client 40 may access those values in the context of verifying search results 68 (described below in further detail in connection with FIG. 5).

Figure 4:
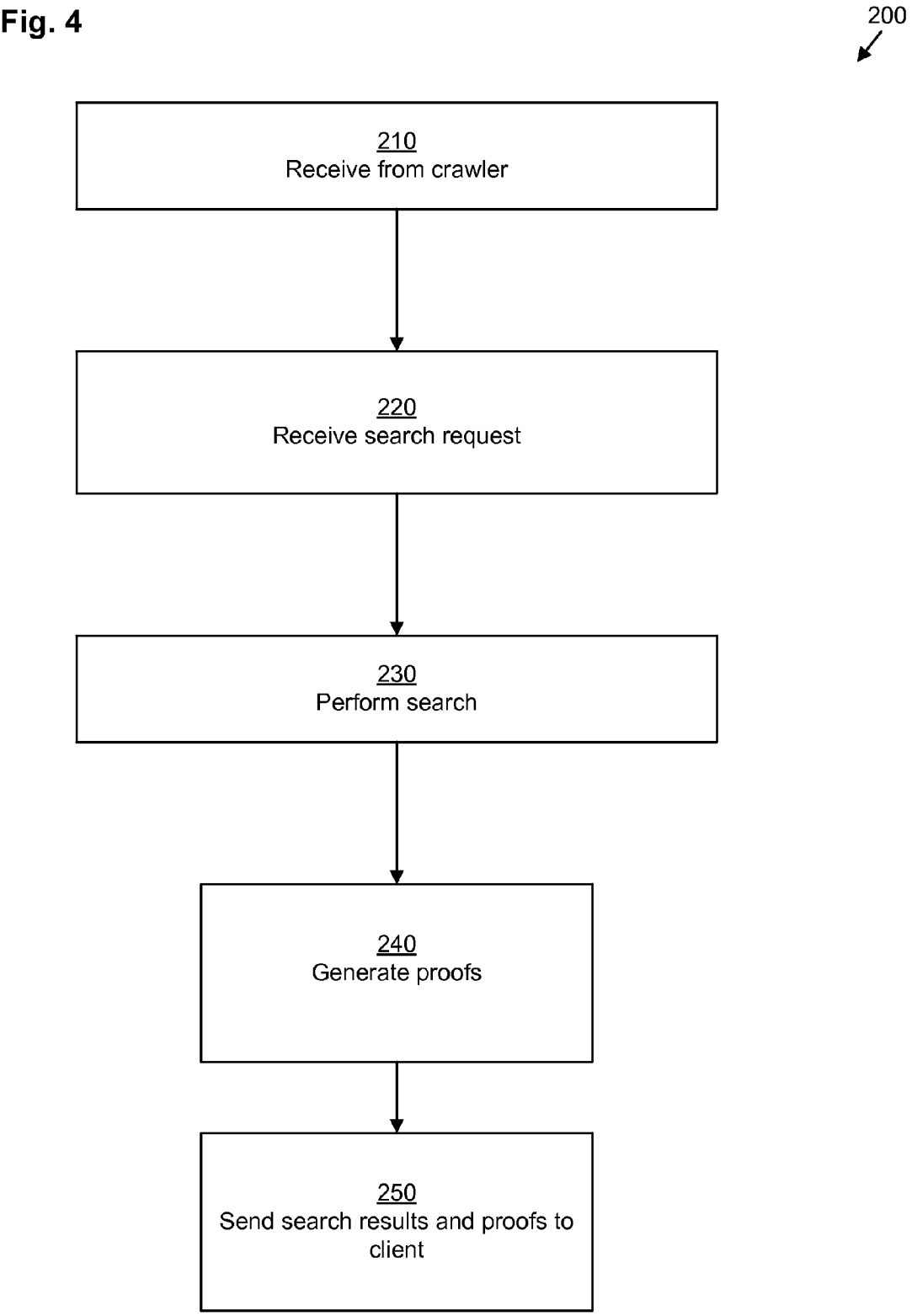

FIG. 4 depicts an example method 200 for a search server 38 to respond to a search request 64 by providing search results 68 and proofs 70 to client 40.

In step 210, search server 38 receives a crawling result 62 from the crawling device 32.

In step 220, search server 38 receives a search request 64 from a client 40. The search request 64 may includes a plurality of data items (e.g., search terms) and one or more operators. Thus, in one embodiment, search request 64 is a conjunctive web search. For example, the search request 64 may be "cats AND dogs AND hamsters AND frogs." This example search request 64 may be written as set Q=$\{q_1, q_2, q_3, q_4\}$ (generally, set Q=$\{q_1, q_2 \ldots, q_u\}$) with operand AND. Disjunctive searches may also be performed.

In step 230, search server 38 performs a search with reference to the search structure 46 (e.g., inverted index 88). For example, for a conjunctive search, search server 38 performs a set intersection operation on the term set TS for each query term. As another example, for a disjunctive search, search server 38 performs a set union operation on the term set TS for each query term. The set operation yields a set of search results 68, e.g., set I=$\{y_1, y_2, \ldots, y_L\}$. For example, the set I of search results 68 might have 5 documents, $\{y_1, y_2, y_3, y_4, y_5\}$ In step 240, search server 38 generates proofs 70 so that client 40 can be assured that the search results 68 are complete and correct. Step 240 may be performed in various ways. For example, the proofs may be generated using Merkle hash trees and bilinear-map accumulators. Background for the underlying mathematical techniques may be found in U.S. Patent Pub. No. 2012/0030468, filed by Charalampos Papamanthou, Roberto Tamassia, and Nikolaos Triandopoulos on Jul. 29, 2011, the contents and teaching of which are hereby fully incorporated by this reference.

Search server 38 may begin by generating a polynomial (e.g., $(s+y_1)(s+y_2)(s+y_3)(s+y_4)(s+y_5)$) over the variable s and calculating the coefficients of the expanded form of the polynomial. Thus, for the conjunctive query example, six coefficients $b_0, b_1, b_2, b_3, b_4, b_5$ are generated. More generally, given L results in set I, search server 38 generates L+1 coefficients $b_0, b_1, \ldots b_L$ for a polynomial of form $b_0 s^0 + b_1 s^1 + b_2 s^2 + b_3 s^3 + b_4 s^4 + b_5 s^5$.

Search server 38 also collects item witnesses 48 associated with each query term in set Q, each item witness 48 being a bilinear accumulation value of form T[j], received from crawler device 32.

Search server 38 also constructs integrity proofs proving that the item witnesses were correctly generated. This may be done by, for each item witness 48, sending sibling nodes of Merkle hash tree 96 along a path from a leaf node of Merkle hash tree 96 corresponding to that item witness 48 up to the root node.

Then search server 38 creates a set of subset witnesses W=$\{w_1, w_2, \ldots, w_u\}$ with each subset witness $w_j$ associated with a different query term $q_j$. Given a query term $q_j$, a complementary term set TS'$[q_j]$ is formed by taking the relative complement of set I in the associated term set TS. Thus TS'$[q_j]$=TS$[q_j]$\I=$\{$TS'$[q_j]_1$, TS'$[q_j]_2, \ldots,$ TS'$[q_j]v\}$. Then, the corresponding subset witness $w_j$ is a bilinear accumulation value of the elements of the associated complementary term set TS', so $w_j = g^{P_j(s)}$ for a complementary subset polynomial $$P_j(s) = \prod_{k=1}^{k=v} (s + TS'[q_j]_k).$$

So, for example, if TS'["cats"]=$\{d_1, d_2, d_3, d_4, d_5, d_6\}$ (each element $d_k$ representing a document containing the word "cats", the document not being in the set I because it doesn't have all four query terms), then $P_1(s)=(s+d_1)(s+d_2)(s+d_3)(s+d_4)(s+d_5)(s+d_6)$.

Then search server 38 creates a set of completeness witnesses C=$\{c_1, c_2, \ldots, c_u\}$ with each completeness witness $c_j$ associated with a different subset witnesses $w_j$, such that $c_j = g^{R_j(s)}$ for an associated completeness polynomial $R_k$. Search server 38 may use an algorithm such as an Extended Euclidian Algorithm to calculate completeness polynomials that satisfy $$\sum_{j=1}^{j=u}(R_j(s)P_j(d))=1.$$

Even though search server 38 does not have the secret key s 94, since search server 38 does have the generator powers 95, by expanding each $P_j(s)$ and $R_j(s)$ into expanded polynomial form, search server 38 is able to calculate the subset witnesses W and completeness witnesses C.

Thus, proofs 70 may include, for each query term, the associated item witness 48 T[j], subset witness $W_j$, and completeness witness $C_j$. Proofs 70 also include integrity proof (e.g., Merkle sibling nodes). In some embodiments, proofs 70 may also include the coefficients of the expanded form of the polynomial, $b_0, b_1, \ldots, b_L$.

In step 250, search server 38 sends the search results 68 and proofs 70 to the client 40 within search response 66.

Figure 5:
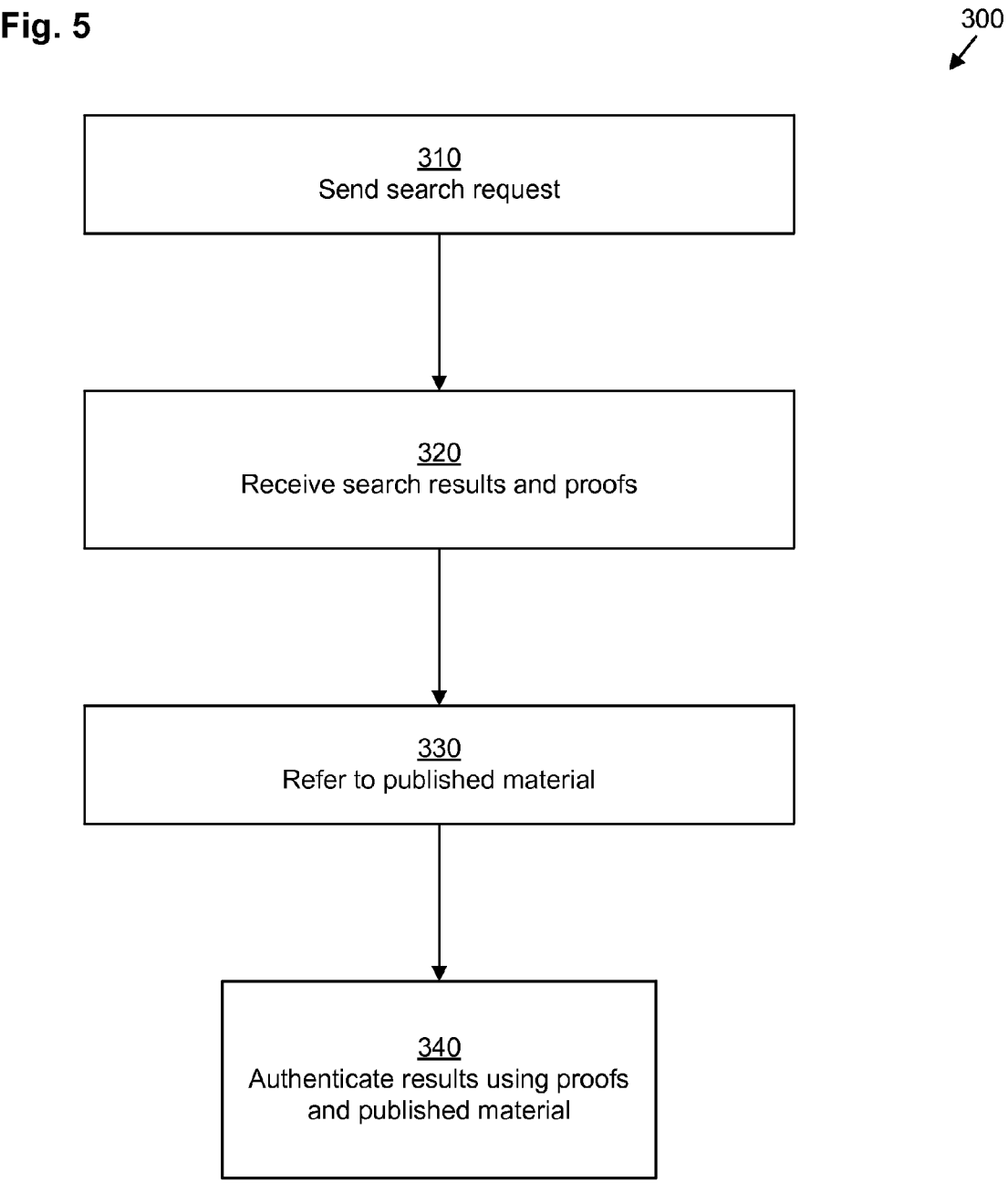

FIG. 5 depicts an example method 300 for a client 40 desiring reliable search results.

In step 310, client 40 sends a search request 64 to the search server 38. Client 40 may not trust search server 40, but client 40 still wishes to be able to rely on the search results 68.

In step 320, client 40 receives a search response 66 back from the search server 38, including search results 68 and proofs 70.

In step 330, client 40 refers to data published by crawler device 32, including signature 54 and security parameters 50 (however, secret key s 94 is not published). This may include downloading a subset of the generator powers 96. In the case of a conjunctive web search that returns L results, the client 40 may download the first L of generator powers 95, (i.e., $g^{\wedge}(s^1)$, $g^{\wedge}(s^2), \ldots, g^{\wedge}(s^L)$).

In step 340, client 40 combines the proofs 70, the search results 68, and the published information in order to verify the search results 68. Step 340 may be performed in various ways. For example, the proofs 70 and search results 68 may be combined with the published information using Merkle hash trees and bilinear-map accumulators.

In some embodiments, client 40 may begin by checking that the coefficients of the expanded form of the polynomial, $b_0, b_1, \ldots b_L$ (which, in some embodiments are received from the search server 38), were correctly generated by the search server 38. Client 40 selects a random value, n, and verifies that $$\sum_{j=0}^{j=L}(b_j n^j)=\prod_{k=1}^{k=L}(n+y_k).$$

In other embodiments, in which search server 38 does not send the coefficients to the client 40, client 40 may generate the coefficients directly from the search results 68 I as described above in connection with step 240. In this latter case, there is no need to check the coefficients.

Client 40 also verifies that the received item witnesses 48 are correct, with reference to the integrity proofs. This may be accomplished by using the received Merkle sibling nodes to calculate the value of the root of the Merkle hash tree 96. If the calculated root is consistent with digest signature 54, then the item witnesses may be verified to be correct.

Client 40 also uses the item witnesses 48, the generator powers 95, the coefficients, and the subset witnesses W to verify that I is a subset of all of the term sets TS[j]; this is referred to as the "subset condition." Because mapping e 93 is a bilinear mapping, due to various mathematical relationships, it can be shown that the truth of the subset condition is logically equivalent to the truth of the following relationship, which can be computed without difficulty, for all j from 1 to u:

$$e\left(\prod_{k=1}^{k=L}\left(g^{s^k}\right)^{b_k},W_j\right)=e(T[j],g)$$

If this relationship holds for all j from 1 to u, then, the subset condition is verified.

Client 40 also uses the item witnesses 48, the generator powers 95, the completeness witnesses C, and the subset witnesses W to verify that the intersection of all of the complementary term set TS'[$q_j$] is the null set; this is referred to as the "completeness condition." Because mapping e 93 is a bilinear mapping, due to various mathematical relationships, it can be shown that the truth of the completeness condition is logically equivalent to the truth of the following relationship, which can be computed without difficulty:

$$\prod_{j=1}^{j=u}e(W_j,C_j)=e(g,g)$$

If this relationship holds, then, the completeness condition is verified.

Upon verifying the integrity of the item witnesses 48 and various additional proofs (e.g., the subset condition, the completeness condition, and, in some embodiments, the correctness of the received coefficients), client 40 is able to verify the search results 68.

Thus, techniques have been described for a trusted crawler 32 to index a distributed collection 33 of data sets 34 and create an authenticated search structure 46 that allows an untrusted search server 38 to return reliably complete and correct search results 68.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described in which the authenticated search structure 44 is constructed by the crawler device 32, this is by way of example only. In some embodiments, the search server 38 constructs the authenticated search structure 44 based on the search structure 44 received from the crawler device 32. In such embodiments, the digest 52 and digest signature 54 serve to verify that the search server 38 has correctly constructed the authenticated search structure 44.

As an additional example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Furthermore, it should be understood that a similar approach was described in "Efficient Verification of Web-Content Searching Through Authenticated Web Crawlers," by Michael T. Goodrich, Duy Nguyen, Olga Ohrimenko, Charalampos Papamanthou, Roberto Tamassia, Nikos Triandopoulos, and Cristina Videira Lopes, published in Proceedings of the Very Large Data Bases (VLDB) Endowment, Vol. 5, No. 10, Pages 920-931, The 38th International Conference on Very Large Data Bases, Aug. 27-31, 2012, Istanbul Turkey, VLDB Endowment 2012, the contents and teaching of which are hereby fully incorporated herein by this reference.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method comprising, by a crawler application running on a computing device connected to a network, the method comprising:
   crawling through a distributed collection of data sets available on the network, at least one data set of the distributed collection being published by an entity distinct and under separate control from the crawler, to generate a search structure indexing a plurality of searchable data items found within the distributed collection of data sets, the search structure establishing a correspondence between each searchable data item and particular data sets that contain that searchable data item;
   generating an authenticated search structure, the authenticated search structure including the search structure and a set of item witnesses using an authentication primitive associated with a set of security parameters, each item witness associated with a particular searchable data item and serving to cryptographically verify which data sets of the distributed collection of data sets correspond to that searchable data item as indicated by the search structure;
   building a digest of the distributed collection of data sets using the authenticated search structure;
   signing the digest to produce a digest signature;
   sending the authenticated search structure and the digest to a search server; and
   publishing the digest signature and the set of security parameters for access by client devices to allow client devices to authenticate results of searches for particular searchable data items performed by the search server over the distributed collection of data sets;
   wherein:
   the crawler application is a web crawler;
   the data sets are hyperlinked web pages;
   the searchable data items are searchable terms that appear within the distributed collection of hyperlinked web pages;
   the item witnesses are term witnesses, each term witness serving to cryptographically verify that a particular sub-collection of the distributed collection of hyperlinked web pages all contain a searchable term associated with that term witness;
   building the digest of the distributed collection of data sets includes building a Merkle hash tree over the set of term witnesses, the Merkle hash tree having a root node;
   signing the digest to produce the digest signature includes signing the root node of the Merkle hash tree;
   the set of security parameters includes:
   a prime integer order, p;
   a generator element, g;
   a first cyclic multiplicative group, G, of order, p, G being generated by g;
   a second cyclic multiplicative group, G', of order, p; and
   a non-degenerate bilinear pairing, e, e mapping G×G→G';
   generating the term witnesses includes, using a secret key, s, s∈$Z_p^*$, for each searchable term, calculating the associated term witness by raising g to the power of a product of multiplicands, each multiplicand being an injective function of s and an identifier of a hyperlinked web page corresponding to that searchable term, for each hyperlinked web page corresponding to that searchable term;
   the particular hyperlinked web pages that contain each searchable term define a term set for that searchable term, that term set having n elements, $t_i$, for i=1 through i=n;
   calculating the associated term witness for each searchable term by raising g to the power of the product of multiplicands includes raising g to the power of $\Pi_{i=1}^{i=n}(s+t_i)$;
   the method further comprises, by the web crawler:
   for all integers, x, from 1 to a maximum size, m, of the term set for any searchable term, computing a set of generator powers, $\{g\hat{}(s^x)\}$, the set of generator powers having m elements; and
   publishing the set of generator powers for access by client devices; and the method further comprises, by the search server:
   receiving a conjunctive term web search request from a client device, the conjunctive term web search request including a plurality of search terms;
   in response to receiving the request, generating a set of search results by performing a set intersection operation between the term sets for each search term of the conjunctive term web search request;
   for each search term:
   generating a Merkle proof for the term witness associated with that search term, the Merkle proof including sibling node values along a path within the Merkle hash tree from a leaf corresponding to that term witness to the root node; and
   generating a subset witness for that search term with reference to a complementary term set associated with that search term, the complementary term set associated with that search term having p elements, $t'_j$, for j=1 through j=p, such that that complementary term set is the relative complement of the set of search results in the term set defined by that search term, the subset witness equal to g raised to the power of $$\prod_{j=1}^{j=p}(s+t'_j),$$

the subset witness being calculated by expanding a mathematical representation of $$\prod_{j=1}^{j=p}(s+t'_j),$$

into a set of polynomial terms of powers of s, calculating a value of g raised to the power of each polynomial term of the set of polynomial terms of powers of s with reference to the set of generator powers, and multiplying the calculated values together;

generating, using an extended Euclidian algorithm, a set of completeness witnesses, each completeness witness of the set of completeness witnesses having a greatest common divisor of 1 with the subset witnesses for all of the search terms; and sending the set of search results, the term witness associated with each search term, the Merkle proof for each search term, the subset witness for each search term, and the set of completeness witnesses to the client device in response to the received conjunctive term web search request.

2. The method of claim 1, wherein:

generating the authenticated search structure includes applying authenticated set operations over sets associated with searchable terms to generate the term witnesses using a bilinear map accumulator associated with the set of security parameters as the authentication primitive.

3. The method of claim 1, wherein, for each term searchable term, $t_i$ is an integer cryptographic hash modulo a prime number of contents of a particular hyperlinked web page that contains that searchable term.

4. The method of claim 1, wherein the method further comprises, by the client device:

(a) sending the conjunctive term web search request to the search server;

(b) receiving the set of search results, the term witness associated with each search term, the Merkle proof for each search term, the subset witness for each search term, and the set of completeness witnesses from the search server in response to the received conjunctive term web search request;

(c) verifying, for each search term, that its associated term witness and Merkle proof are consistent with the published tree signature;

(d) verifying, with reference to the published set of security parameters and the published set of generator powers, for each search term, with reference to the term witness associated with that search term and the subset witness for that search term, that the set of search results is a subset of the term set for that term;

(e) verifying, with reference to the published set of security parameters, the subset witness for all of the search terms, and the completeness witness for all of the search terms, that an intersection of the complementary term sets for all of the search terms is null; and (f) in response to verifying (c), (d), and (e), validating that the set of search results is complete and correct.

5. The method of claim 4, wherein:

the set of search results can be injectively mapped to a result set over $Z_p^*$, the result set having q elements, $t''_k$, for k=1 to k=q;

the method further comprises, at the search server:

calculating coefficients of a polynomial expansion of $P(s)=\Pi_{k=1}^{k=q}(s+t''_k)$, yielding q+1 result coefficients, $b_r$; and sending the q+1 result coefficients from the search server to the client device; and at the client device, verifying (d) includes:

verifying that, for a randomly-selected value $w \in Z_p^*$, $\Sigma_{r=0}^{r=q} b_r w^r = \Pi_{k=1}^{k=q}(w+t''_k)$; and for each search term, verifying that applying the non-degenerate bilinear pairing, e, to the subset witness for that search term and a product of, for all r=0 to r=q, an r-th generator power of the set of generator powers raised to the power of $b_r$, is equivalent to applying the non-degenerate bilinear pairing, e, to g and the term witness for that search term, the r-th generator power corresponding to $g^{\hat{}}(s^r)$.

6. The method of claim 4 wherein:

the set of search results can be injectively mapped to a result set over $Z_p^*$, the result set having q elements, $t''_k$, for k=1 to k=q;

the method further comprises, at the client device, calculating coefficients of a polynomial expansion of $P(s)=\Pi_{k=1}^{k=q}(s+t''_k)$, yielding q+1 result coefficients, $b_r$; and at the client device, verifying (d) includes for each search term, verifying that applying the non-degenerate bilinear pairing, e, to the subset witness for that search term and a product of, for all r=0 to r=q, an r-th generator power of the set of generator powers raised to the power of $b_r$, is equivalent to applying the non-degenerate bilinear pairing, e, to g and the term witness for that search term, the r-th generator power corresponding to $g^{\hat{}}(s^r)$.

7. The method of claim 1, wherein the search structure is an inverted index and the method further comprises:

subsequent to crawling through the set of hyperlinked documents, re-crawling through a revised set of hyperlinked documents and generating a revised inverted index of the plurality of search terms, the revised inverted index including a first search term corresponding to the particular hyperlinked documents that previously contained that searchable term plus a new hyperlinked document that did not previously contain that searchable term, the term set for the first search term being redefined to include an additional element, $t_{n+1}$, corresponding to the new hyperlinked document;

generating a revised term witness for the first search term by raising the term witness associated with the first search term to the power of $(s+t_{n+1})$;

generating a revised Merkle hash tree by modifying a leaf of the Merkle hash tree corresponding to the term witness for the first search term to instead correspond to the revised term witness for the first search term and modifying nodes of the revised Merkle hash tree along a path from the leaf to a root node of the revised Merkle hash tree;

signing the root node of the revised Merkle hash tree to produce a revised tree signature;

sending the revised inverted index, the revised Merkle hash tree, and the revised term witness for the first search term to the search server; and publishing the revised tree signature for access by client devices to allow client devices to authenticate results of conjunctive term web searches performed by the search server over the revised set of hyperlinked documents.

8. The method of claim 1, wherein the search structure is an inverted index and the method further comprises:

subsequent to crawling through the set of hyperlinked documents, re-crawling through a revised set of hyperlinked documents and generating a revised inverted index of the plurality of search terms, the revised inverted index including a first search term corresponding to the particular hyperlinked documents that previously contained that searchable term excluding a removed hyperlinked document that previously contained that searchable term, the term set for the first search term being redefined to exclude element, $t_z$, corresponding to the removed hyperlinked document;

generating a revised term witness for the first search term by raising the term witness associated with the first search term to the power of $(s+t_z)^{-1}$;

generating a revised Merkle hash tree by modifying a leaf of the Merkle hash tree corresponding to the term witness for the first search term to instead correspond to the revised term witness for the first search term and modifying nodes of the revised Merkle hash tree along a path from the leaf to a root node of the revised Merkle hash tree;

signing the root node of the revised Merkle hash tree to produce a revised tree signature;

sending the revised inverted index, the revised Merkle hash tree, and the revised term witness for the first search term to the search server; and publishing the revised tree signature for access by client devices to allow client devices to authenticate results of conjunctive term web searches performed by the search server over the revised set of hyperlinked documents.

9. The method of claim 1 wherein:
the search server is untrusted by the client; and
the client is able to authenticate the results of the searches for particular searchable data items performed by the search server over the distributed collection of data sets such that the client is able to verify that results of the searches are both correct and complete.

10. The method of claim 1 wherein the client is able to authenticate the results of the searches for particular searchable data items performed by the search server over the distributed collection of data sets such that the client is able to verify that results of the searches are both correct and complete, having not been modified by a Man in the Middle attacker.

11. A computer program product comprising a non-transitory computer-readable storage medium storing instructions, which, when performed by a computing device, cause the computing device to perform the operations of:

crawling through a distributed collection of data sets available on a network, at least one data set of the distributed collection being published by an entity distinct and under separate control from the computing device, to generate a search structure indexing a plurality of searchable data items found within the distributed collection of data sets, the search structure establishing a correspondence between each searchable data item and particular data sets that contain that searchable data item;

generating an authenticated search structure, the authenticated search structure including the search structure and a set of item witnesses using an authentication primitive associated with a set of security parameters, each item witness associated with a particular searchable data item and serving to cryptographically verify which data sets of the distributed collection of data sets correspond to that searchable data item as indicated by the search structure;

building a digest of the distributed collection of data sets using the authenticated search structure;

signing the digest to produce a digest signature;

sending the authenticated search structure and the digest to a search server; and publishing the digest signature and the set of security parameters for access by client devices to allow client devices to authenticate results of searches for particular searchable data items performed by the search server over the distributed collection of data sets;

wherein:
the computing device serves as a web crawler;
the data sets are hyperlinked web pages;
the searchable data items are searchable terms that appear within the distributed collection of hyperlinked web pages;
the item witnesses are term witnesses, each term witness serving to cryptographically verify that a particular sub-collection of the distributed collection of hyperlinked web pages all contain a searchable term associated with that term witness;
building the digest of the distributed collection of data sets includes building a Merkle hash tree over the set of term witnesses, the Merkle hash tree having a root node;
signing the digest to produce the digest signature includes signing the root node of the Merkle hash tree;
the set of security parameters includes:
a prime integer order, p;
a generator element, g;
a first cyclic multiplicative group, G, of order, p, G being generated by g;
a second cyclic multiplicative group, G', of order, p; and
a non-degenerate bilinear pairing, e, e mapping G×G→G';
generating the term witnesses includes, using a secret key, s, s∈$Z_p^*$, for each searchable term, calculating the associated term witness by raising g to the power of a product of multiplicands, each multiplicand being an injective function of s and an identifier of a hyperlinked web page corresponding to that searchable term, for each hyperlinked web page corresponding to that searchable term;
the particular hyperlinked web pages that contain each searchable term define a term set for that searchable term, that term set having n elements, $t_i$ for i=1 through i=n;
calculating the associated term witness for each searchable term by raising g to the power of the product of multiplicands includes raising g to the power of $$\prod_{i=1}^{i=n}(s+t_i);$$

the instructions further cause the computing device to perform the operations of:
for all integers, x, from 1 to a maximum size, m, of the term set for any searchable term, computing a set of generator powers, $\{g^{(s^x)}\}$, the set of generator powers having m elements; and
publishing the set of generator powers for access by client devices; and the search server is configured to:
receive a conjunctive term web search request from a client device, the conjunctive term web search request including a plurality of search terms;
in response to receiving the request, generate a set of search results by performing a set intersection operation between the term sets for each search term of the conjunctive term web search request;

for each search term:
  generate a Merkle proof for the term witness associated with that search term, the Merkle proof including sibling node values along a path within the Merkle hash tree from a leaf corresponding to that term witness to the root node; and
  generate a subset witness for that search term with reference to a complementary term set associated with that search term, the complementary term set associated with that search term having p elements, $t'_j$, for j=1 through j=p, such that that complementary term set is the relative complement of the set of search results in the term set defined by that search term, the subset witness equal to g raised to the power of $$\prod_{j=1}^{j=p}(s+t'_j),$$

the subset witness being calculated by expanding a mathematical representation of $$\prod_{j=1}^{j=p}(s+t'_j)$$

a set of polynomial terms of powers of s, calculating a value of g raised to the power of each polynomial term of the set of polynomial terms of powers of s with reference to the set of generator powers, and multiplying the calculated values together;
  generate, using an extended Euclidian algorithm, a set of completeness witnesses, each completeness witness of the set of completeness witnesses having a greatest common divisor of 1 with the subset witnesses for all of the search terms; and
  send the set of search results, the term witness associated with each search term, the Merkle proof for each search term, the subset witness for each search term, and the set of completeness witnesses to the client device in response to the received conjunctive term web search request.

12. An apparatus comprising:
a network interface connected to a network;
a processor; and
memory, the memory storing instructions, which, when performed by the processor, cause the processor to perform the operations of:
  crawling through a distributed collection of data sets available on the network, at least one data set of the distributed collection being published by an entity distinct and under separate control from the apparatus, to generate a search structure indexing a plurality of searchable data items found within the distributed collection of data sets, the search structure establishing a correspondence between each searchable data item and particular data sets that contain that searchable data item;
  generating an authenticated search structure, the authenticated search structure including the search structure and a set of item witnesses using an authentication primitive associated with a set of security parameters, each item witness associated with a particular searchable data item and serving to cryptographically verify which data sets of the distributed collection of data sets correspond to that searchable data item as indicated by the search structure;
  building a digest of the distributed collection of data sets using the authenticated search structure;
  signing the digest to produce a digest signature;
  sending the authenticated search structure and the digest to a search server; and
  publishing the digest signature and the set of security parameters for access by client devices to allow client devices to authenticate results of searches for particular searchable data items performed by the search server over the distributed collection of data sets;
wherein:
  the apparatus serves as a web crawler;
  the data sets are hyperlinked web pages;
  the searchable data items are searchable terms that appear within the distributed collection of hyperlinked web pages;
  the item witnesses are term witnesses, each term witness serving to cryptographically verify that a particular subcollection of the distributed collection of hyperlinked web pages all contain a searchable term associated with that term witness;
  building the digest of the distributed collection of data sets includes building a Merkle hash tree over the set of term witnesses, the Merkle hash tree having a root node;
  signing the digest to produce the digest signature includes signing the root node of the Merkle hash tree;
  the set of security parameters includes:
    a prime integer order, p;
    a generator element, g;
    a first cyclic multiplicative group, G, of order, p, G being generated by g;
    a second cyclic multiplicative group, G', of order, p; and
    a non-degenerate bilinear pairing, e, e mapping G×G→G';
  generating the term witnesses includes, using a secret key, s, s∈$Z_p^*$, for each searchable term, calculating the associated term witness by raising g to the power of a product of multiplicands, each multiplicand being an injective function of s and an identifier of a hyperlinked web page corresponding to that searchable term, for each hyperlinked web page corresponding to that searchable term;
  the particular hyperlinked web pages that contain each searchable term define a term set for that searchable term, that term set having n elements, $t_i$, for i=1 through i=n;
  calculating the associated term witness for each searchable term by raising g to the power of the product of multiplicands includes raising g to the power of $$\prod_{i=1}^{i=n}(s+t_i);$$

the instructions further cause the processor to perform the operations of:
    for all integers, x, from 1 to a maximum size, m, of the term set for any searchable term, computing a set of generator powers, $\{g^{(s^x)}\}$, the set of generator powers having m elements; and
    publishing the set of generator powers for access by client devices; and the search server is configured to:

receive a conjunctive term web search request from a client device, the conjunctive term web search request including a plurality of search terms;

in response to receiving the request, generate a set of search results by performing a set intersection operation between the term sets for each search term of the conjunctive term web search request;

for each search term:

generate a Merkle proof for the term witness associated with that search term, the Merkle proof including sibling node values along a path within the Merkle hash tree from a leaf corresponding to that term witness to the root node; and generate a subset witness for that search term with reference to a complementary term set associated with that search term, the complementary term set associated with that search term having p elements, $t'_j$, for $j=1$ through $j=p$, such that that complementary term set is the relative complement of the set of search results in the term set defined by that search term, the subset witness equal to g raised to the power of $$\prod_{j=1}^{j=p} (s + t'_j),$$

the subset witness being calculated by expanding a mathematical representation of $$\prod_{j=1}^{j=p} (s + t'_j)$$

a set of polynomial terms of powers of s, calculating a value of g raised to the power of each polynomial term of the set of polynomial terms of powers of s with reference to the set of generator powers, and multiplying the calculated values together;

generate, using an extended Euclidian algorithm, a set of completeness witnesses, each completeness witness of the set of completeness witnesses having a greatest common divisor of 1 with the subset witnesses for all of the search terms; and send the set of search results, the term witness associated with each search term, the Merkle proof for each search term, the subset witness for each search term, and the set of completeness witnesses to the client device in response to the received conjunctive term web search request.

\* \* \* \* \*